Oct. 8, 1940.   W. E. VAN DORN   2,217,033
SUSPENSION SYSTEM FOR VEHICLES
Filed Nov. 7, 1939   3 Sheets-Sheet 1
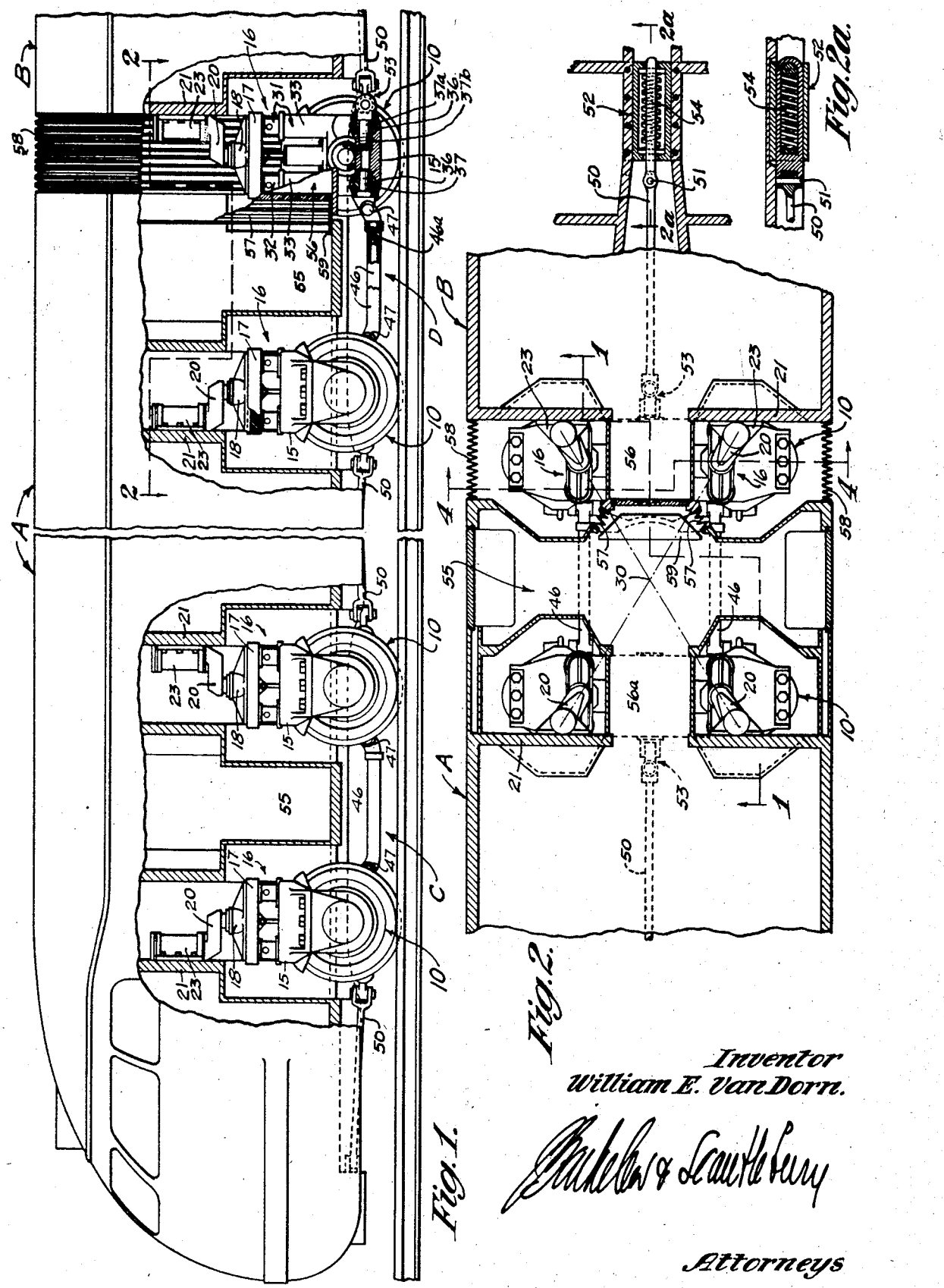
Inventor
William E. Van Dorn.
Attorneys Patented Oct. 8, 1940

2,217,033

UNITED STATES PATENT OFFICE 2,217,033

SUSPENSION SYSTEM FOR VEHICLES

William E. Van Dorn, Los Angeles, Calif., assignor to Pacific Railway Equipment Company, Los Angeles, Calif., a corporation of California Application November 7, 1939, Serial No. 303,231

13 Claims. (Cl. 105—453)

This invention relates to suspension system for vehicles. The invention is generally applicable to varoius types of vehicles, and although it has been specifically designed for application to railway vehicles and will therefore be illustratively described as applied to them, the invention is not limited to that particular application and use. The invention has two further adaptations and uses, one for the suspension and control of vehicle bodies regardless of articulation, and the other for suspension, control and draft connection of articulated vehicle bodies.

This present application and its appended claims are directed to the system of suspension and control of general adaptation regardless of articulation. My copending application entitled Suspension system for vehicles, filed on even date herewith and bearing Ser. No. 303,232, and the claims therein, are directed to the system of suspension and control for articulated vehicles. The present application is a continuation in part of my application entitled Suspension system for vehicles, Ser. No. 43,692, filed October 5, 1935; and said copending application Ser. No. 303,232, is a continuation in part of said previously filed application.

The general object of the invention is the provision of a system of suspension and control which enables vehicle bodies, and particularly railway vehicles, to be hung at a level lower than that necessitated by present vehicle suspensions, which gives to the vehicle body a controlled oscillatory motion about a high level longitudinal axis, rather than the tilting or rolling motion to which present date vehicle bodies are subjected when subject to lateral forces; and, in general, gives to such a vehicle body controlled motions and freedoms that result in higher safety and increased passenger comfort, and therefore enables higher speed to be attained even on present day road beds and within the present regulations and restrictions applied to railway rolling stock.

My invention provides for hanging the vehicle body at a relatively low level and with a relatively low center of gravity. And also, by the nature and action of its load-taking elements, and by its provision of lateral restraint applied to the body at a high level, it provides for oscillatory swinging of the body about a high longitudinal axis above the center of gravity. This last mentioned provision causes the body to swing pendulously when subjected to any lateral thrusts, such as the lateral thrusts due to misalinement of trackage or centrifugal thrusts in rounding curves. The motion of the body under such thrusts is one of banking rather than that of tilting or rolling.

In its preferred form, as herein described, the suspension and control system involves a set or unit of two laterally spaced supporting and controlling elements each mounted below upon the truck or wheel unit without the intervention of any bolster frame or central support in the nature of a swivel. These two supporting and controlling elements are spaced laterally from each other at opposite sides of, and symmetrically with respect to, the longitudinal center of the truck and body. They extend upwardly from the truck or wheel unit, being more or less columnar in nature, and are supportingly and controllingly connected with the body, or some rigid portion of the body, through flexible or articulative parts located at a level above substantially the level of the body center of gravity. Each of these elements includes a member having a vertically elastic or vertically yielding action by which the load of the body is sprung and by which the body is given the oscillatory freedom necessary for its swinging banking action. And each of these elements also includes articulated members which, connecting with the body at the high level, restrict or restrain lateral translative motion of the body at that high level and consequently fix a high level swinging axis for the body.

The articulate members which have just been spoken of also include suspension and body guiding and control members which also provide for the horizontal swivelling motion of the body with relation to the truck or wheel and axle unit. These articulate members, specifically illustrated in the form of pairs of horizontally swinging links or arms, give the body a virtual swivelling center which may be longitudinally removed from the points of suspension. When the vehicle bodies are articulated through a common truck the draft between the bodies is exclusively transmitted through the truck. And preferably the arrangement in that case is such that the two adjacent bodies, mounted on a single truck, have substantially coincident swivelling centers.

Finally the body or bodies are draft-connected with the truck or wheel and axle unit through a draft connection which is arranged at the relatively low level of the truck or wheel unit and well below the level at which the bodies are suspended upon the truck. This draft connection, preferably and illustratively in the form of a longitudinal draft bar, is freely flexible in all directions except longitudinally. In a longitudinal direction it has some yieldability, for the absorption of longitudinal shocks; but its structure and action are such that the draft forces which are transmitted through the truck at a low level are transmitted between the truck and the car bodies exclusively through the low level draft connections, and not through the high level suspension and control connections to the body.

Further objects and the corresponding features and accomplishments of the invention will be understood from the following detailed and specific description of illustrative embodiments, reference for the purpose being had to the accompanying drawings, in which:

Fig. 1 is a fragmentary side view, partly in elevation and partly in section on line 1—1 of Fig. 2, showing my suspension control system typically applied;

Fig. 2 is a plan section taken as indicated by line 2—2 on Fig. 1;

Fig. 2a is a detail section taken as indicated by line 2a—2a on Fig. 2;

Figure 3:
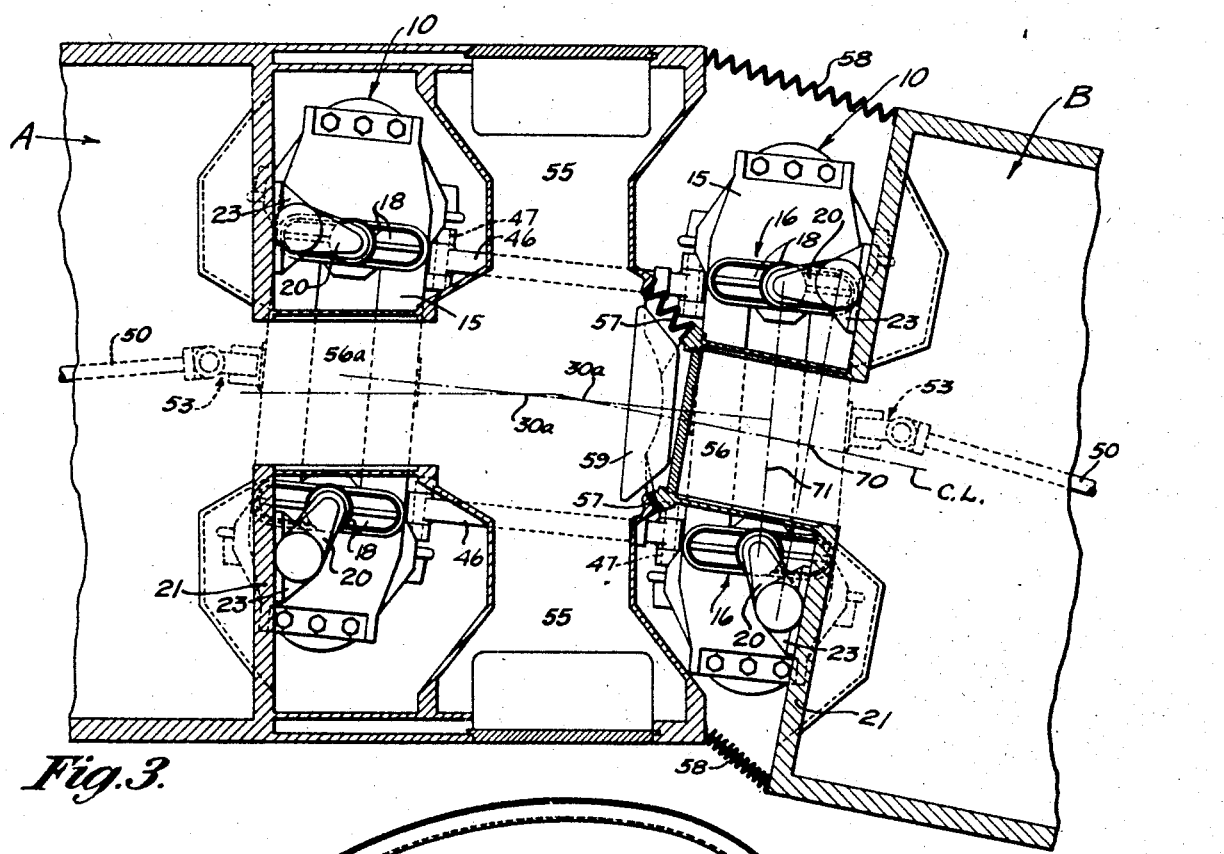
Fig. 3 is an enlarged plan section similar to Fig. 2 but illustrating the articulation action of the suspension system in rounding curves.

In the drawings in Fig. 1 I have illustrated two vehicle bodies A and B, suspended on two truck units which are designated generally in Fig. 1 as C and D. Each of these truck units C and D comprises two wheel and axle units 10; and the vehicle body A is illustrated as being supported at one end upon both the axle units 10 of truck unit C; while the truck unit D has one of its wheel and axle units 10 supporting an end of vehicle body A and its other wheel and axle unit 10 supporting the adjacent articulated end of vehicle body B. The two truck units C and D and their body suspending and controlling devices are the same. Particular description will be given for the one that suspends both car bodies.

As illustrated here, each wheel and axle unit comprises a pair of wheels 11, each wheel being set on a stub axle 12 which is suitably journaled at 13 and 14 in an axle frame 15 of the "drop" or U type. Mounted upon each axle frame 15 there are two upwardly reaching and laterally spaced columnar structures 16 which include upper heads 17 that are vertically movable. These upper heads 17 carry one member 18 of a universal joint, here shown as a ball-and-socket joint; and the other member 19 of the joint is carried by the free end of a pivoted link arm 20. These pivoted arms are connected with and mounted upon a rigid portion of the respective car body, as for instance upon a structural cross partition 21. The arms 20 lie in a substantially horizontal plane and are of the general nature of cranks, being connected with the car body through their vertical pivotal shafts 22 being mounted in journals 23 which are rigidly attached to the structural partitions 21. The arms 20 are thus mounted so that they may swing about vertical axes in a horizontal plane with reference to the car body. And the general arrangement is such that in their normal positions the two link arms 20 of each pair converge, when viewed in plan, toward a point 30 which is located in the longitudinal central plane of the car body and longitudinally removed from the transverse plane through the universal joints 18, 19. And, as shown in Fig. 2, the other pair of links 20 which are associated with the other wheel and axle unit belonging to the same truck, also preferably converge in plan on that same point 30, for reasons which will hereinafter appear. The general function of these pivoted links is to allow the car body to swivel about a vertical swivelling axis, with relation to the truck. The function performed by the arrangement of these links in horizontal converging disposition is to space the vertical swivelling axis longitudinally from the supporting elements.

Figure 4:
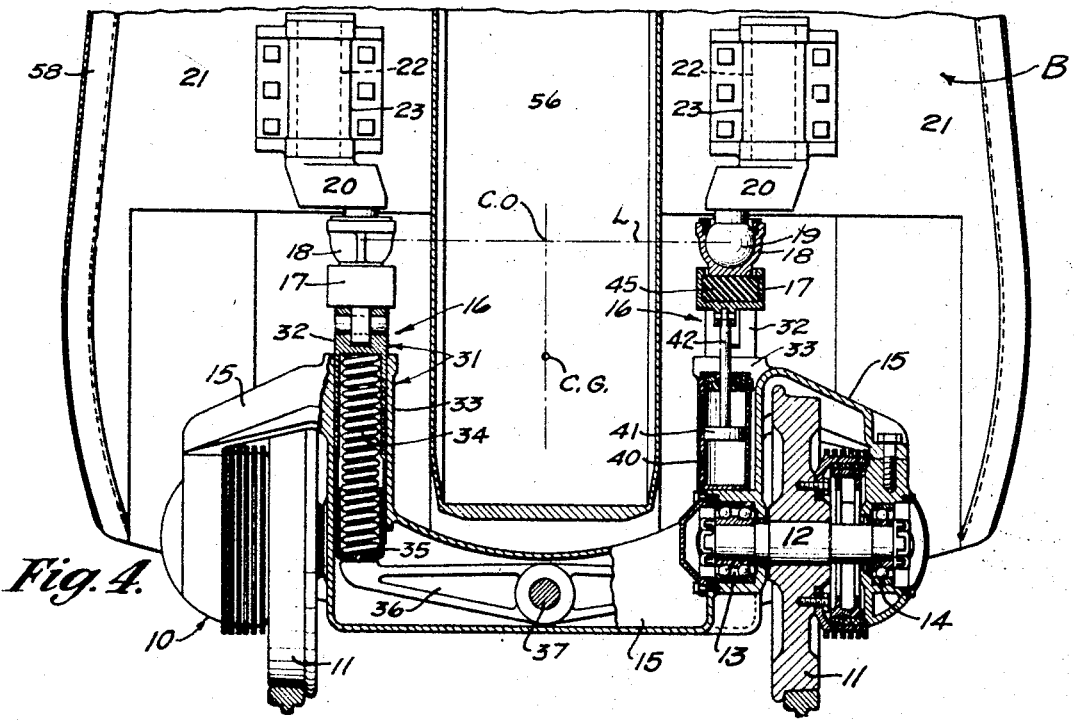
Fig. 4 is an enlarged cross section taken as indicated by line 4—4 on Fig. 2.

Each columnar structure 16 is here shown as including two vertical longitudinally spaced telescopic spring columns 31. In Fig. 4 these spring columns are shown as comprising vertically movable plungers 32 which are vertically guided in the portions 33 of frame 15, and which are directly attached to and support heads 17. Springs 34 are contained within the telescopic column thus formed and support plungers 32 and head 17 and thus elastically support the weight of the car body through the articulation formed by the universal joints 18, 19 and the swinging arms 20.

In the form of suspension shown in Fig. 4 the lower ends of springs 34 are supported in cups 35, and opposite spring-supporting cups are supported on the opposite ends of a lateral equalizing lever 36 which is centrally pivoted on the pivot pin 37 or 37a mounted in frame 15. By reference to Fig. 1 it will be seen that one of these levers 36 is mounted upon a short central longitudinal stud pin 37, while the stud pin 37a which carries the other lever 36 is screw-threaded at 37b into frame 15, so as to be securely longitudinally connected with the frame and at the same time to be rotative about a longitudinal axis, for purposes which will appear.

Associated with each columnar structure 16 there is preferably a dash-pot which comprises a cylinder 40 and a piston 41 whose rod 42 is directly attached to the column structure head 17. The details of this dash-pot structure need not be described as they are well known. The purpose and function is to retard and damp the vertical movements and vertical oscillations of the columnar structures and the car bodies.

The mounting of frame 15 upon its respective wheels may be through the medium of any suitable mounting arrangement. In the present illustration the frame is shown as carrying the axle bearings directly, without the interposition of any means allowing relative movements or means for absorbing shocks. Each head 17 carries a rubber or similar pad 45 upon which the universal joint element 18 is carried, for the purpose of shock absorption, and allowance for errors of misalinement.

As shown in Figs. 1, 2 and 3, the two axle frames 15 of each truck are interconnected by a pair of longitudinally extending and laterally spaced connector links 46 whose opposite ends are connected to the axle frames 15 by the horizontal pivot pins 47. By removing these pins the two wheel and axle units may be separated and the two adjacent cars thereby be disconnected. Each of these links 46 contains a screw-threaded swivel joint 46a which allows of swivelling about a longitudinal axis. By the described structure the two axle frames, and the two wheel and axle units of each truck, are interconnected so that, in plan, the two wheel and axle units form a substantially rigid parallelogram in which the axes of the axles are kept substantially in parallelism; but at the same time the two axle frames may tilt relative to each other, and to the respective car body or bodies, in longitudinal plane, and also may twist about a longitudinal axis relative to each other in order to properly follow uneven trackage.

The columnar structures 16 reach up above the axle frames and into the car bodies to such an elevation that the level L of the two articulate ball joints 18, 19, is preferably well above the body center of gravity, which is indicated C. G. in the drawings. This is for the purpose of suspending the body for lateral swinging oscillation about a longitudinal center above substantially the level of center of gravity, and for the purpose of applying to the body, at that high level, a restrain on its lateral motion which will force the body to oscillate about that high center of oscillation. But this suspension and control connection to the body at that high level does not constitute a longitudinal draft connection. In fact, in the present illustrative structure no draft forces at all are transmitted through that high connection because the two axle frames, and the truck, are not restricted by that high connection against longitudinal movement relative to the car body or bodies. The whole structure, including the longitudinally tiltable frame 15 that forms the base of the supporting columns, is such that the supporting columnar structures are longitudinally tiltable with reference to the body and the truck and consequently allow relative longitudinal freedom to the body.

Longitudinal draft connection between the trucks, or the wheel and axle units, and the respective body or bodies, is here illustrated as being made exclusively at a relatively low level; at substantially the level of the axle frames or of the axles themselves, and well below the level of suspension and control connection to the body. Thus each wheel and axle unit, or axle frame, is connected to its respective body by a low level longitudinal draw bar 50. The body end of this draw bar is connected by the vertical loose pivot 51 with the yielding or spring device 52 which is mounted on the under side of the body frame. And the truck end of each draw bar is shown as connected through the universal joint 53 with the outer end of the swivelling pivot stud 37a. The spring device 52 is of the ordinary and well-known construction which opposes the action of its comparatively stiff spring 54 to relative longitudinal movement of the draw bar 50 in either direction. The draft connection is thus one which limits and restricts relative longitudinal movement between truck or wheel and axle unit, and car body, at a low level, but allows all other relative movements by reason of the lateral, vertical and torsional flexibility of the draft connection.

As I have noted before, Fig. 1 shows the truck D in an arrangement where it performs the function of articulation between the two car bodies A and B. In Figs. 1, 2 and 3, these two car bodies A and B are shown in close end to end relation, but there is no draft connection directly between the two car bodies, all draft between the two car bodies, both positive and negative, being transmitted exclusively at low level through the truck and the longitudinal draft connections to and between the car bodies.

In the figures referred to the car A is shown as having the entrance and exit vestibule 55 at one end. The adjacent end of car B is not provided with such a vestibule but only with the small entrance passage 56 which, corresponding to the passage 56a in car A, lies between the two supporting columnar structures 16. Thus, only one end of each car need have an entrance vestibule, and the total floor space of each car may therefore be more efficiently utilized for passenger or other purposes. As shown in the drawings the two adjacent car ends are simply juxtaposed, intervening bellows or other similar elements 57 and 58 and a floating floor panel 59 closing the intervening gaps.

The several relative motions between the truck or wheel and axle unit and the car body will now be explained. Relative longitudinal motion is allowed by the action just above explained, being allowed by the relative longitudinal movement, longitudinal tipping, of the columnar structures which suspend and control the car body at the described relatively high level. The relative longitudinal movement is allowed by the described longitudinal movement of the supporting structure, and is controlled and restricted solely by the low level draft connection.

Figure 5:
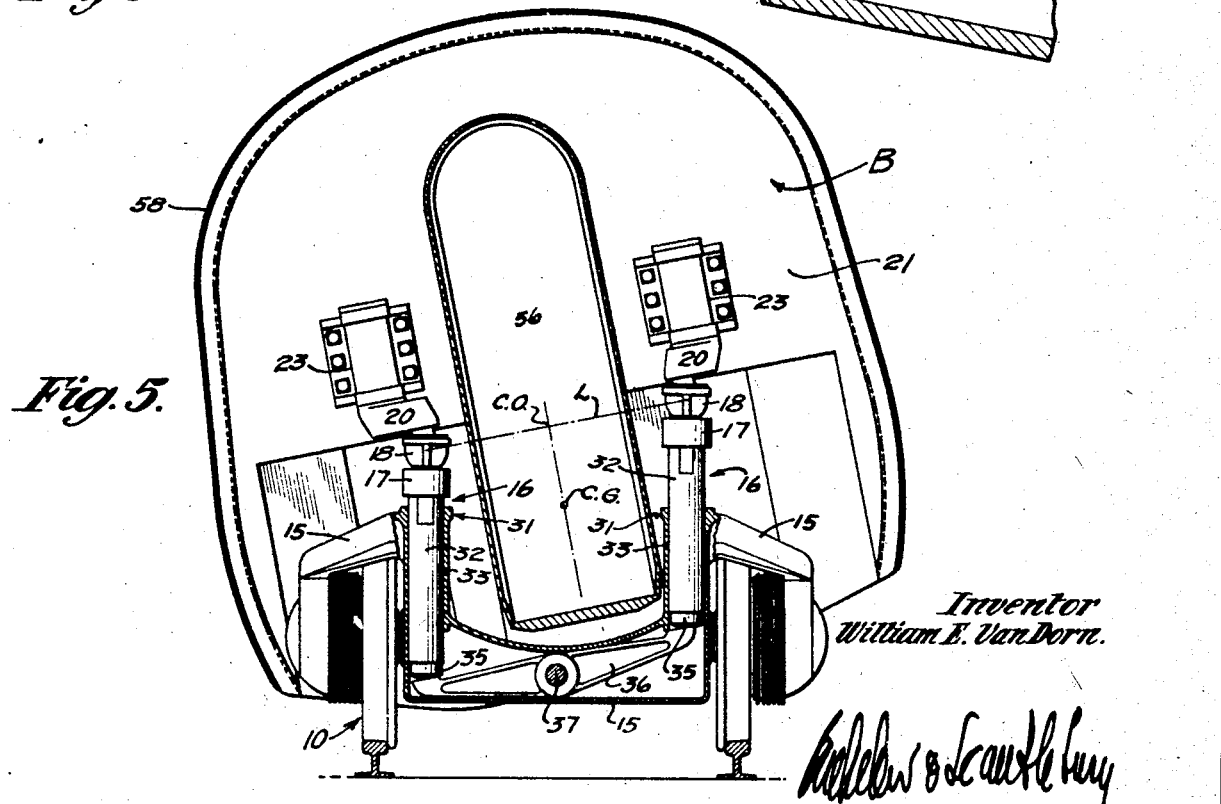
Fig. 5 is a sectional view showing typical positions of the parts of the suspension system when the body swings about its high longitudinal axis.

Relative lateral movement between the car body and the truck or wheel and axle unit takes place in the form of lateral oscillation or swinging of the car body about the defined high level longitudinal axis. Whenever the car body is subjected to any lateral thrust, as for instance by lateral unevenness of trackage, or by centrifugal forces engendered in rounding a curve, those lateral thrusts and forces may be considered as a single lateral force acting upon the center of gravity or mass of the car body. Due to the fact that the car body is restrained against lateral motion at the high level L, and due also to the fact that the lateral restraining means is articulate (such as is represented by the ball joints at the upper ends of the vertically yielding and vertically movable controlling columns) the body is restrained from translative lateral movement at that level and consequently must move laterally about a longitudinal axis disposed substantially at that level. Thus, when subject to any lateral thrusts the body swings about a high longitudinal center of oscillation located substantially at the position denoted C. O. in the drawings. Fig. 5 illustrates a typical relative position taken by the body when subjected to a lateral thrust from the left in that figure. The left hand columnar structure 16 is depressed while the right hand structure rises. In the form of the invention shown in Figs. 4 and 5, the two columnar structures may, although not necessarily, rise and fall equally, and the two sets of springs 34 may remain under substantially equal compression, due to the equalizing action of lever 36. And the dash-pots act to retard and damp the swinging oscillation to whatever degree may be desired.

Figure 6:
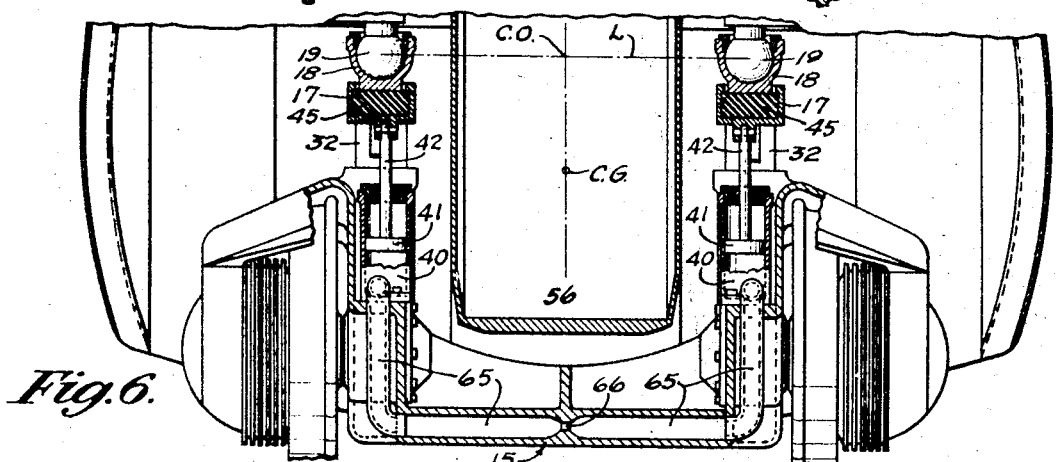
Fig. 6 is a cross section showing a modified construction.
Figure 7:
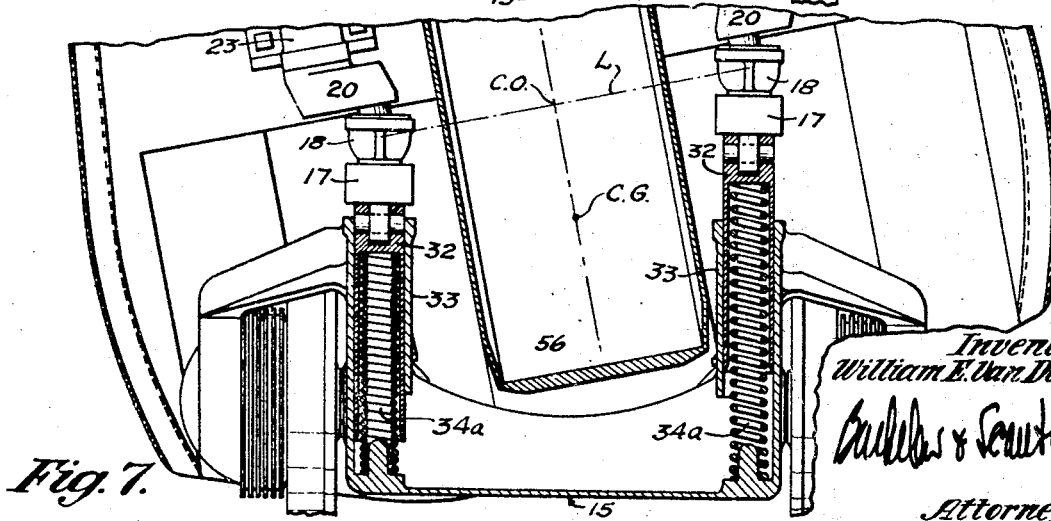
Fig. 7 is a cross section of the form shown in Fig. 6 and illustrating the swinging or banking action of that form.

In the form of the invention shown in Figs. 6 and 7, the equalization connection between the two laterally spaced supporting and controlling structures may be applied to those structures through the medium of the dash-pot controls instead of through the medium of the suspension springs. Here the equalization is shown as being effected by a fluid conduit 65 which is connected between the lower ends of the opposite dash-pot cylinders 40, the conduit containing a restricted orifice 66 of a size suitable to the degree of retardation and damping desired. And in this form of the invention the lower ends of the supporting springs 34a, instead of being mounted on the equalizing lever 36, are mounted directly upon the axle frame 15.

In this form of the invention oscillative swinging about the high center of oscillation is caused and controlled by the same suspensions and lateral controls as before described; but in this case the oscillative swinging is allowed by the elastic compressions and extensions of the suspension springs 34a, instead of by the bodily yielding vertical movement of the spring columns which may take place in the form previously described.

So far as concerns the motion of lateral oscillation of the car body, the centers of the ball joints 18, 19 may be looked at as the points at which the vertically yielding and articulate suspension and controlling columns are connected with a rigid portion of the car body. If the body and truck are travelling a straight-away track the link arms 20 remain rigidly in substantially the relative positions that are shown in Fig. 2. When the car body swings to such a position as illustrated in Figs. 5 and 7, the linear distance between the centers of the articulate joints 18, 19 increases slightly, and the angle of convergence of the laterally opposed arms of a pair consequently decreases slightly. But, in whatever relative position the arms are put by that action, they still remain in full effect rigid parts of the body insofar as translative lateral movement of the body at that level is concerned. And the same is true when the relative positions of the arms are changed by swivelling action of the car body with relation to the truck when rounding a curve. Lateral forces cannot move the body translatively at the level L, regardless of the relative positions of arms 20, except to the slight extent permitted by the lateral elasticity of pads 45.

The swivelling action of the various parts in rounding a curve is illustrated in Fig. 3. Due to the orientation, in plan, of the two sets of link arms 20, a virtual swivelling center is set up for both car bodies A and B at the common center indicated by the numeral 30 in Fig. 2, when the car bodies and truck are in their normal straight-away position. In rounding a curve, when the car bodies A and B take such a relative angular position as shown in Fig. 3, the arms 20 swing in horizontal planes to the typical positions shown in that figure. For an average or normal maximum angularity of the car bodies, or normal minimum curve radius, the virtual centers of swivelling of the two car bodies remain very closely coincident, having a maximum displacement to such points as are indicated at 30a in Fig. 3.

Again it may be noted that into whatever relative angular positions the arms 20 are moved by swivelling motions of the car bodies, the arms in that position are rigid with respect to the car bodies so far as relative movement by any lateral forces are concerned. And consequently columnar structures which suspend and control motions of car body still exert their lateral restraints on the car body at the specified high level, acting through the effectively rigid arms 30.

It may also be noted that when there is a change in the angular relationship of the two arms 20 of a pair, as for instance shown in Fig. 3 the car body also moves slightly longitudinally with reference to the truck or the wheel axle unit. Thus, in Fig. 3, the arms of each pair have moved to a greater angle of convergence than in the normal position of Fig. 2. The point indicated diagrammatically at 70 in Fig. 3 is a fixed point with relation to the car body B. The transverse line indicated diagrammatically at 71 in that figure is a fixed line in relation to the upper ends of the supporting columnar structures 16. In moving to the relative positions shown in Fig. 3 the distance of point 70 from line 71, measured along center line C. L. of the body, is somewhat less than it is when the car bodies and truck are in their normal straight-away positions. This slight relative longitudinal movement between the car body and the upper ends of the suspension system is allowed for mainly or quite wholly by the longitudinal tilting of the suspension system which has been before described as allowing relative longitudinal movement between the car body and the truck or wheel and axle unit. The draft connection may allow some slight relative longitudinal movement between the car body and the truck or wheel and axle unit, but by the very nature of its duties its longitudinal yielding is comparatively stiff. Relative longitudinal movement between the car body and the truck or wheel and axle unit, from whatever cause, is therefore taken care of by the longitudinal tilting yieldability of the upstanding columnar supporting and control structures, tilting about the axis of the wheel and axle unit and about the horizontal transverse high axis which extends between the laterally opposed ball joints 18, 19 of a pair.

I claim:

1. In combination with a car body and a wheel unit located beneath the body; a suspension system for the body on the wheel unit, comprising two body supporting elements supported at their lower ends on the wheel unit, spaced from each other laterally at opposite sides of the vertical longitudinal central plane of the body, extending up into the body to a level above substantially the center of gravity of the body, and each being independently vertically yielding; independent supporting connections between the upper ends of each of the supporting elements and the body, each of which connections includes a body supporting arm articulated at one end to the element and at the other end to the body, one of said articulations being universally swivelling and located at said defined level, and each arm being swingable about its last mentioned articulation in a direction having a longitudinal component; and means restricting translative lateral movement of the last mentioned articulation of each arm relative to the wheel unit.

2. In combination with a car body and a wheel unit located beneath the body; a suspension system for the body on the wheel unit, comprising two body supporting elements supported at their lower ends on the wheel unit, spaced from each other laterally at opposite sides of the vertical longitudinal central plane of the body, extending up into the body to a level above substantially the center of gravity of the body, and each being independently elastically vertically yielding; independent supporting connections between the upper ends of each of the supporting elements and the body, each of which connections includes a body supporting arm articulated at one end to the element and at the other end to the body, one of said articulations being universally swivelling and located at said defined level, and each arm being swingable about its last mentioned articulation in a direction having a longitudinal component; and means restricting translative lateral movement of the last mentioned articulation of each arm relative to the wheel unit.

3. In combination with a car body and a wheel unit located beneath the body; a suspension system for the body on the wheel unit, comprising two body supporting columnar structures supported at their lower ends on the wheel unit, extending up into the body to a level above substantially the center of gravity of the body and laterally spaced from each other at opposite sides of the vertical longitudinal central plane of the body, each of said columnar structures being independently vertically yielding, restricted against lateral movement with relation to the wheel unit and including a vertically elastic supporting element; and independent supporting connections between the upper ends of each of the columnar structures and the body, each of which connections includes a body supporting arm articulated at one end to the columnar structure and at the other end to the body, one of said articulations being universally swivelling and located at said defined level, and each arm being swingable about its last mentioned articulation in a direction having a longitudinal component.

4. In combination with a car body and a wheel unit located beneath the body; a suspension system for the body on the wheel unit, comprising; a frame mounted on the wheel unit, two upwardly extending guide members mounted on the frame laterally spaced from each other at opposite sides of the vertical central longitudinal plane of the body, vertically movable members guided one by each of the guide members, universal pivotal joints one at the upper end of each vertically movable member, said joints located at a level above substantially the center of gravity of the body, links connected each at one end with one of said joints and at the other end pivotally connected with the body to swing only horizontally relative thereto, and a vertically elastic body supporting spring associated with each vertically movable member to support it.

5. In combination with a vehicle body and a wheel unit beneath the body, a suspension system for the body on the wheel unit, comprising; a pair of vertically yielding body supporting members, spaced laterally from each other at opposite sides of the vertical central longitudinal plane of the body, mounted on the wheel unit below and reaching up in the body to a level above substantially the center of gravity of the body, and a pair of substantially horizontally disposed non-parallel arms each pivotally connected at one end to the upper end of one of said members and pivotally connected at the other end to the body, one of said pivotal connections for each arm restricting its motion to swinging in a substantially horizontal plane.

6. In combination with a vehicle body and a wheel unit beneath the body; a suspension system for the body on the wheel unit, comprising two longitudinally spaced pairs of vertically yielding body supporting members, the members of each pair being spaced laterally from each other at opposite sides of the vertical longitudinal central plane of the body, mounted on the wheel unit below and reaching up in the body to a level above substantially the center of gravity of the body, four horizontally disposed arms each pivotally connected at one end to the upper end of one of said members and pivotally connected at the other end to the body, one of said pivotal connections for each arm restricting its motion to swinging in a substantially horizontal plane, said four arms being arranged so as normally to converge toward a substantially common point located in said central longitudinal plane and midway between the said longitudinally spaced pairs of supporting members.

7. In combination with a car body and a wheel unit located beneath the body; a suspension system for the body on the wheel unit, comprising two body supporting elements supported at their lower ends on the wheel unit, spaced from each other laterally at opposite sides of the vertical longitudinal central plane of the body, extending up into the body to a level above substantially the center of gravity of the body, and each said element being independently vertically yielding; independent supporting connections between the upper ends of each of the supporting elements and the body, each of which connections includes a body supporting arm articulated at one end to the element and at the other end to the body, one of said articulations being universally swivelling and located at said defined level, and each arm being swingable about its last mentioned articulation in a direction having a longitudinal component; means restricting translative lateral movement of the last mentioned articulation of each arm relative to the wheel unit; and longitudinal draft connection between the wheel unit and the body comprising a connector located substantially in the vertical longitudinal central plane of the body and exclusively at the substantial level of the wheel unit and below the first defined level, and having flexibility vertically, laterally and torsionally about a longitudinal axis.

8. In combination with a car body and a wheel unit located beneath the body; a suspension system for the body on the wheel unit, comprising two body supporting columnar structures supported at their lower ends on the wheel unit, extending up into the body to a level above substantially the center of gravity of the body and laterally spaced from each other at opposite sides of the vertical longitudinal central plane of the body, each of said columnar structures being independently vertically yielding, restricted against lateral movement with relation to the wheel unit and including a vertically elastic supporting element; independent supporting connections between the upper ends of each of the columnar structures and the body, each of which connections includes a body supporting arm articulated at one end to the columnar structure and at the other end to the body, one of said articulations being universally swivelling and located at said defined level, and each arm being swingable about its last mentioned articulation in a direction having a longitudinal component; and longitudinal draft connection between the wheel unit and the body comprising a connector located substantially in the vertical longitudinal central plane of the body and exclusively at the substantial level of the wheel unit and below the first defined level, and having flexibility vertically, laterally and torsionally about a longitudinal axis.

9. In combination with a car body and a wheel unit located beneath the body; a suspension system for the body on the wheel unit, comprising two body supporting and controlling elements supported at their lower ends on the wheel unit, spaced laterally from each other at opposite sides of the vertical longitudinal central plane of the body, extending upwardly from the wheel unit and each independently supportingly connected with the body at their upper ends, said elements being oppositely yieldable in a longitudinal direction to permit swivelling of the body in a horizontal plane relative to the wheel and axle unit, and said elements being oppositely vertically yielding, and said suspension system also including flexible means acting on the body substantially exclusively at a level above substantially the center of gravity of the body to restrain translative lateral movement of the body at that level with relation to the wheel unit and to allow lateral movement of the body at all other levels, said suspension system being yielding longitudinally, and longitudinal draft connection between the wheel unit and the body comprising a connector located substantially in the vertical longitudinal central plane of the body and exclusively at substantially the level of the wheel unit and below said level of lateral control, and having flexibility vertically, laterally and torsionally about a longitudinal axis so as to allow vertical, lateral swinging, and horizontal swivelling movements relatively between the body and the wheel unit.

10. In combination with a car body and a wheel unit located beneath the body; a suspension system for the body on the wheel unit, comprising two body supporting columnar structures supported at their lower ends on the wheel unit, extending up into the body to a level above substantially the center of gravity of the body and laterally spaced from each other at opposite sides of the vertical longitudinal central plane of the body, each said columnar structure including a vertically telescoping pair of tubular members resistant to lateral displacement, and a vertically elastic spring within the tubular members; and independent supporting connections between the upper ends of each of the columnar structures and the body, each of which connections includes a body supporting arm articulated at one end to the columnar structure and at the other end to the body, one of said articulations being universally swivelling and located at said defined level, and each arm being swingable about its last mentioned articulation in a direction having a longitudinal component.

11. In combination with a car body and a wheel unit beneath the body; a suspension system for the body on the wheel unit, comprising two body supporting and controlling elements supported at their lower ends on the wheel unit, spaced laterally from each other at opposite sides of the vertical longitudinal central plane of the body, extending upwardly into the body to a level above substantially the center of gravity of the body, each of said elements being independently elastically vertically yielding and each independently supportingly connected with a rigid part of the body at said level, and said elements being oppositely yieldable in a longitudinal direction to permit swivelling of the body in a horizontal plane relative to the wheel unit; and longitudinal draft connection between the wheel unit and the body comprising a connector located substantially in the vertical longitudinal central plane of the body and exclusively at the substantial level of the wheel unit and below the first defined level, and having flexibility vertically, laterally and torsionally about a longitudinal axis so as to allow vertical, lateral swinging, and horizontal swivelling movements relatively between the body and the wheel unit.

12. In combination with a car body, a truck comprising two longitudinally spaced wheel units, a frame mounted on each wheel unit to swing thereon in a vertical plane longitudinal of the body, a vertically flexible and laterally rigid connection between the two frames; a vertically elastic supporting unit mounted on each of the frames, extending upwardly therefrom and flexibly and supportingly connected at its upper end to the body at a level above the substantial center of gravity of the body, said flexible supporting connection allowing angular movement between the supporting unit and the body in a longitudinal vertical plane; and longitudinal draft connection between at least one of the frames and the body comprising a longitudinal connector located substantially in the plane of the wheel units and below said flexible supporting connection and having vertical flexibility.

13. In combination with a car body and a wheel unit beneath the body; a suspension system for the body on the wheel unit, comprising two body supporting and controlling elements supported at their lower ends on the wheel unit, spaced laterally from each other at opposite sides of the vertical longitudinal central plane of the body, extending upwardly into the body to a level above substantially the center of gravity of the body, each of said elements being elastically vertically yielding and each independently supportingly connected with a rigid part of the body at said level, and said elements being oppositely yieldable in a longitudinal direction to permit swivelling of the body in a horizontal plane relative to the wheel unit; equalizing means whereby the vertical movements of said two elements are balanced against each other; and longitudinal draft connection between the wheel unit and the body comprising a connector located substantially in the vertical longitudinal central plane of the body and exclusively at the substantial level of the wheel unit and below the first defined level, and having flexibility vertically, laterally and torsionally about a longitudinal axis so as to allow vertical, lateral swinging, and horizontal swivelling movements relatively between the body and the wheel unit.

WILLIAM E. VAN DORN.